Patented Feb. 11, 1930

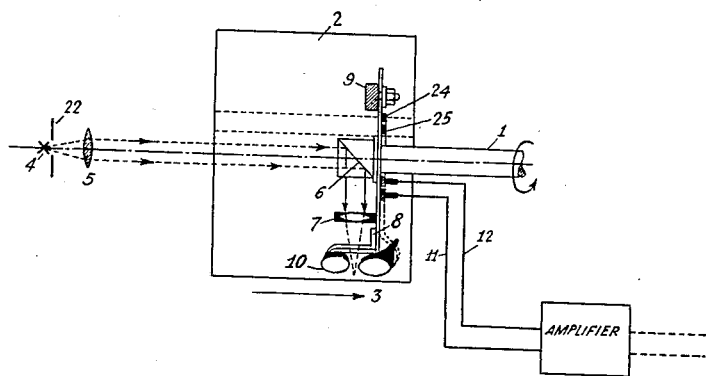
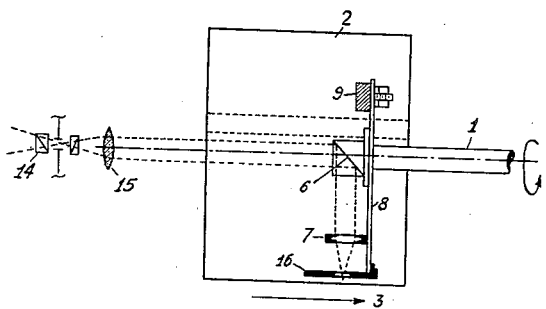
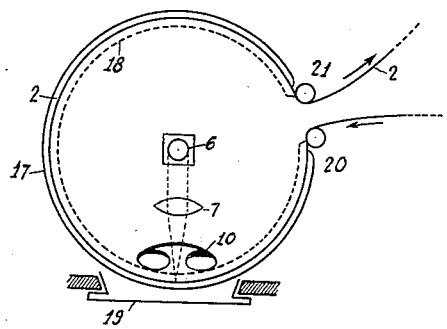

1,746,407

UNITED STATES PATENT OFFICE

FRITZ SCHRÖTER, OTTO SCHRIEVER, AND PETER SCHNITZELER, OF BERLIN, GERMANY, ASSIGNORS TO GESELLSCHAFT FÜR DRAHTLOSE TELEGRAPHIE M. B. H., OF BERLIN, GERMANY, A CORPORATION OF GERMANY

FACSIMILE-TRANSMITTING ARRANGEMENT

Application filed March 31, 1928, Serial No. 266,186, and in Germany April 7, 1927.

The present invention relates to an arrangement for the transmission of facsimiles of documents of all kinds by wire or by radio by means of driving gears or mechanisms driven in perfect synchronism and at equal phases, and by the use of photo-electric exploration at the sending end, and the photographic recording or reproduction by means of a light spot at the receiving end whose brightness is varied and controlled by the incoming currents.

The arrangement herein disclosed concerns the so-called continuous transmission. In other words, unlike the drum or cylinder type of apparatus heretofore customarily used, in which picture surfaces having the size of said drums are transmitted, the facsimile telegram is passed at the transmitting and in the form of a continuous or connected strip through the exploring device, while at the receiving end it is recorded upon a strip or film sensitive to light action and paid out from a storage roll. Hence, tedious and time-consuming manipulations associated with the replacing of the documents or films in the old drum-type apparatus and the stopping and re-starting thereof are avoided, indeed, the revolving means of the apparatus, once synchronized, will continue revolving at the same rate of speed and at the same phase equality.

The essential features of the invention are shown in Figs. 1 to 3, in which embodiments of the basic idea are shown by way of example. Fig. 1 shows the exploration of the picture at the sending end; Fig. 2 the corresponding recording at the receiving end; while Fig. 3 is a schematic view of the guiding of the connected facsimile telegram strip and the receiving film through the apparatus.

Referring to Fig. 1, the revolving spindle or shaft 1 is positioned exactly co-axially with reference to the picture surface 2 wound on the inner wall of a cylindrical guide device according to Fig. 3. The shaft 1 is maintained in synchronism in any desired and known manner and by any approximate means. Hence, constradistinct to the drum system, the document here forms the inner cylinder surface upon which the exploring light point is to describe the well-known helical analyzing or scanning line as the shaft 1 is rotated. Such helix is obtained by that, while shaft 1 rotates, the cylindrical carrier of 2 is shifted upon a suitable conveyor device, say, a slide 19 (Fig. 3), in the direction of the arrow 3. 4 is a light source with a diaphragm 22 placed in front thereof. The rays issuing from the light source are passed through the aperture of lens 5 are rendered parallel by the latter, and are then fed, after having been centered parallel to the axis, to the deflector mirror 6 at an angle of 45 degrees with relation to the direction of the axis. The said mirror 6 may preferbaly consist of a silvered contact surface of two rectangular glass prisms. But in its stead also total reflection of a properly mounted prism or some other reflector means may be resorted to. The rays deflected from 6 in radial direction are collected by the adjustable lens 7 in the shape of a sharp light spot upon the picture surface to be explored. They incidentally pass the annular tube of a photo-electric cell 10 which is rigidly secured by separate holding means on the revolving arrangement 8. 9 denotes an adjustable counterweight to place the center of gravity of the revolving arrangement comprising the parts 6, 7, 8, 9, and 10 exactly in the axis. The photo-electric currents are taken off at slip rings, 24 and 25 whence they are fed by way of brushes and leads 11, 12, to the amplifier 13 with which the sending outfit proper is connected in well-known manner.

Instead of using an annular photo-electric cell 10 as shown in Fig. 1, it will be understood that any other photo-electric exploring means of known kind may be employed.

The reference numerals of corresponding parts shown in Fig. 2 are the same as above referred to in connection with Fig. 1. The revolving arrangement which is supported by the shaft 1 and which again runs exactly co-axially with reference to the film or photographic paper surface 2 wrapped on the inside of a similar cylinder carrier, has also in this outfit means balanced by counterweight 9 and comprises the reflector surface 6, holder 8, the adjustable lens 7, and a diaphragm 16 which is essential in order to afford protection against internal light reflections and which should conveniently be made of a dull black surface, said diaphragm allowing only of the passage of a pencil of light rays which falls through a minute aperture. Such light as is reflected from the film which in the absence of said diaphragm 16 would exercise a disturbing effect upon the rest of the sensitized surface, is sufficiently screened by diaphragm 16, and in this manner unintentional blackening effects are prevented. Light whose intensity is controlled by the incoming current in accordance with the transmitted picture is furnished, for instance, from a stationary Kerr cell and accessory optical means 14 of well-known kind consisting of the crosses Nicol prisms. The light is then rendered parallel by a lens 15, and in such condition of exact parallelism to the axis it is supplied to the revolving deflecting mirror 6 whence the light travels over the same path as in Fig. 1 until it is collected in the shape of a revolving sharply outlined luminous spot on the film.

Fig. 3 illustrates in what way the uninterrupted strip is wound around the inner face of the cylindrical surface both at the sending and at the receiving end. For this purpose is used a tube-like carrier 17 upon which the picture strip 2 is snugly applied. To insure such intimate application, elastic pressing means, for instance, in the shape of sheet strips may be provided which apply the picture strip snugly against the inner surface 17 at its two margins so that its form will be strictly cylindrical and co-axial with the revolving shaft 1. If deemed necessary, additional means provided with the revolving exploring or recording devices may be used, for instance, by that rollers are rotated conjointly with the part 8 whereby the particular part just undergoing exploration or reproduction of the picture is made to press particularly firmly against the carrier 17. The telegram strip or tape upon which the news or documents to be transmitted in the shape of a facsimile are directly written or printed, or upon which they may be pasted, is fed into and delivered from the cylinder 17 by way of rollers 20, 21, as shown in Fig. 3. In this way also loose telegraphic material may be worked by that it is placed between two guide bands the upper one of which turned towards the illuminating side after having been wound into the cylinder 17, must be transparent (for instance, a celluloid strip). These strips which serve merely for conveying purposes should be conveniently of the endless kind. At the receiving end, in a similar way, a film or photographic paper strip is passed through 17.

In the transmitter apparatus as hereinbefore disclosed, winding and transmitting of the connected picture strip is effected in sections, the advance from one transmission to the next being by an amount corresponding to the inner circumference of 17. Contradistinct from apparatus of the type wherein the exploring or the recording light spot moves transversely to a picture strip continuously travelling through the apparatus, the apparatus herein disclosed operates in a way so that the strip is explored or recorded parallel to its longitudinal direction. The portion applied upon the inner face of 17 remains in the same position throughout the whole process of duration of the transmission. The line-by-line exploration of its whole surface, as the shaft 1 is revolved, is effected by that 17 is subjected to a parallel shift in the direction of the arrow 3 (Figs. 1 and 2) by the aid of a guided slide 19 or the like. The same should be equal or practically equal in both the transmitter and the receiver, though no strict synchronization is required. Only the shafts 1 in the sender and receiver apparatus should be operated under proper synchronism and phase equality conditions. After the whole surface has been transmitted, then the picture strip by the aid of a crank or other conveyor device is displaced a distance equalling the inner circumference of 17, whereupon transmission of this new picture portion may be effected.

Having now described our invention we are entitled to all modifications thereof as fairly fall within its spirit and scope as defined by the following claims, wherein, we claim:—

1. A picture transmission system including, a picture supporting surface, a picture carried within said supporting surface, a lens system carried within said supporting surface, means for rotating said lens system for causing a beam of light from said lens system from an external point to trace a helical path across said picture surface in a direction longitudinally thereof.

2. In a picture transmitting and receeiving apparatus, a support surface, a recording surface carried within said support surface, a rotary shaft within said support, a source of light external to said support, means for directing a beam of light from said external source to point within said support, a lens system carried by said rotary shaft and arranged in the path of said directed light beam and means provided by said lens system for redirecting said light beam to said picture surface within said support member, means for moving said light system transversely to said picture surface and means provided by said rotary shaft for advancing said lens system and reflected light beam for causing said light beam to trace a helical path longitudinally of said picture surface.

3. In a picture transmission and reception apparatus, a support drum, a picture for transmission mounted within said drum, a light source external to said drum and means for directing the light beam from said source to a point within said drum, a rotary shaft within said support surface, a lens and photo cell structure supported from said rotary shaft, said lens being arranged to project a light beam issuing from said source against said picture surface along a path at substantially right angles to the line of said shaft and means for causing the light issuing from said source and reflected by said lens to said photocell upon said picture surface to trace a helical path on said picture surface longitudinally thereof in the direction of motion of said rotary shaft member.

4. In a picture transmission apparatus, a support drum, a picture surface carried within said drum, means for holding said surface tight with respect to said support drum, a source of light external to said support drum and a lens system for directing light issuing from said source to a point within said drum, a rotary shaft carried within said drum and arranged to advance transversely of said drum, a lens and photo cell system mounted upon the end of said rotary shaft and arranged for rotary motion with respect to said support drum, means provided by said rotary lens system for directing the light reaching said drum from said external source through said photo cell upon said picture surface, whereby reflected light beams as varied in intensity by changes in the intensity of light and shadow on said picture surface influence said photo cell, means provided by said rotary shaft for causing said reflected beam to trace a helical path formed as a series of lines extending substantially longitudinally of said picture surface, an external amplifying and transmitting circuit, and means for transferring currents flowing from said photo cell to said external transmitting and amplifying apparatus.

5. In a picture transmission and reception apparatus, a support drum, a picture surface wrapped around and carried by said support drum, a source of light external to said drum, a rotary shaft within said drum, means carried by said rotary shaft for reflecting light issuing from said external source and directing said light as a point upon said picture surface carried by said drum, a photo cell supported at the end of said rotary shaft, said cell being arranged to be influenced by the varying reflections of the light striking said picture surface, means for balancing the weight of said photo cell and lens arrangement whereby the center of gravity of said system is maintained at the center of said rotary shaft, and means for transferring the currents flowing from said photo cell in accordance with variations in reflected light reaching said cell.

6. In a picture transmitting system, a support drum, a picture surface carried within said drum, a rotary shaft within said drum, said shaft being arranged to move in a longitudinal manner with respect to said drum, a source of light external to said drum, means for directing said light as parallel rays to the center of said drum, a lens system carried by said shaft for directing said parallel rays from said external source along a path at substantially right angles to the extreme path and arranged to focus said redirected light as a point source of light upon said picture surface, a photo cell supported by said shaft, said photo cell being arranged to be influenced by reflected light from said picture surface, means for rotating said reflecting lens and said photo cell as a unit for causing said projected light to trace a helical path longitudinally of said picture surface, an amplifier external to said system and means for transferring currents flowing from said photo cell to said amplifier.

FRITZ SCHRÖTER.
OTTO SCHRIEVER.
PETER SCHNITZELER.

CERTIFICATE OF CORRECTION.

Patent No. 1,746,407.　　　　　　　　　　Granted February 11, 1930, to

FRITZ SCHROTER ET AL.

It is hereby certified that error appears in the printed specification of the above numbered patent requiring correction as follows: Page 1, line 18, for the word "and" read "end"; line 65, for the misspelled word "preferbaly" read "preferably"; page 2, line 10, for the word "sufficiently" read "efficiently"; line 102, claim 1, after the word "picture" second occurrence, insert the word "surface"; line 110, claim 2, for the misspelled word "receeiving" read "receiving"; and that the said Letters Patent should be read with these corrections therein that the same may conform to the record of the case in the Patent Office.

Signed and sealed this 29th day of July, A. D. 1930.

(Seal)　　　　　　　　　　　　　　　　　Wm. A. Kinnan,
　　　　　　　　　　　　　　　　　Acting Commissioner of Patents.